(12) United States Patent
Coogle

(10) Patent No.: US 6,651,690 B1
(45) Date of Patent: Nov. 25, 2003

(54) CHEMICAL DELIVERY SYSTEM FOR AIR CONDITIONING DRAINAGE PIPES

(76) Inventor: Gregory Coogle, 492 NW. 162nd Ave., Pembroke Pines, FL (US) 33028

( * ) Notice: Subject to any disclaimer, the term of this patent is extended or adjusted under 35 U.S.C. 154(b) by 0 days.

(21) Appl. No.: 10/144,124

(22) Filed: May 10, 2002

(51) Int. Cl.$^7$ .............................................. B01D 11/02
(52) U.S. Cl. ..................... 137/268; 422/264; 210/198.1
(58) Field of Search .......................... 137/268; 422/264, 422/292; 210/198.1

(56) References Cited

U.S. PATENT DOCUMENTS 5,286,377 A * 2/1994 Galvan ................... 422/264 X
5,402,813 A * 4/1995 Keen ....................... 137/268 X
5,514,344 A * 5/1996 D'Agaro ..................... 422/116
5,976,364 A   11/1999 Williams
6,558,538 B2 * 5/2003 Scuilla et al. ............ 210/198.1

* cited by examiner

Primary Examiner—Kevin Lee
(74) Attorney, Agent, or Firm—J. Sanchelima

(57) ABSTRACT

A system for releasing growth inhibiting chemicals downstream in an air conditioner drain assembly. The system also allows a user to vary the concentration and time for releasing the growth inhibitor chemical. A main elongated tubular member is perpendicularly connected with inlet and outlet tubular members that include rotably mounted female connectors that are removably connected with threaded male connectors. The latter in turn are connected to upstream and downstream drain pipe lines. The inherent structure of the system facilitates its operation and maintenance.

3 Claims, 1 Drawing Sheet

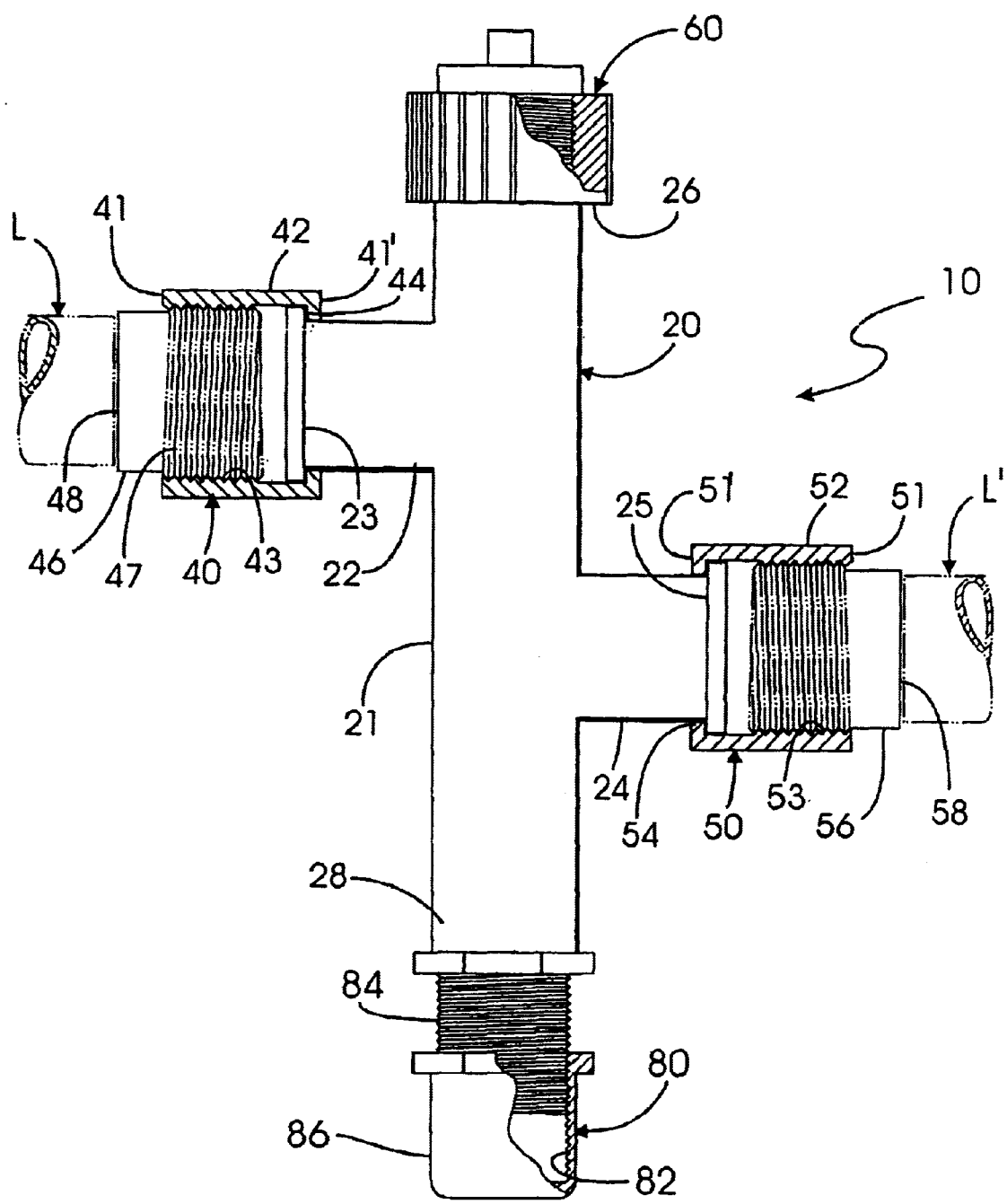

CHEMICAL DELIVERY SYSTEM FOR AIR CONDITIONING DRAINAGE PIPES

BACKGROUND OF THE INVENTION

1. Field of the Invention

The present invention relates to a chemical delivery system for air conditioning drainage pipes, and more particularly, the type that provides for time-release anti-clogging chemicals.

2. Description of the Related Art

Many designs for chemical delivery systems have been designed in the past. The condensation of water in air conditioning equipments requires the constant collection and disposal of water through drainage pipes or lines. Sometimes, the water stands still encouraging the growth of algae, bacteria and other organisms that clog the pipes. None of these systems, however, include a collection reservoir for slowly dissolving and dispensing of chemicals in the air conditioning drainage pipes in a cost efficient manner.

Applicant believes that the closest reference corresponds to U.S. Pat. No. 5,976,364 issued to Danny R. Williams in 1999 for an apparatus for treating air conditioner condensate with algicide. Williams' patented apparatus provides dissolving biotic growth composition into air conditioner condensate fluid. The Willams' apparatus includes a housing for holding the inhibitor and a container, located within the housing. The container allows contact between the inhibitor and condensate while retaining undissolved inhibitor in the housing. However, it differs from the present invention because the present invention does not utilize any moving parts that are susceptible to malfunctioning. The present invention allows a user to control the concentration of the inhibitor (liquid or solid) depending on the dimensions of container. Also, Williams' device cannot use liquid inhibitors, as they would be washed out with the condensate.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a chemical delivery system for air conditioning drainage pipes that allows the release of an inhibitor, liquid or solid, over time without being washed immediately.

It is another object of this invention to provide a chemical delivery system for air conditioning drainage pipes that can be readily cleaned.

It is still another object of the present invention to provide a system that permits a user to determine the concentration and release time that will elapse for the distribution of the inhibitor through the drain lines.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWING

With the above and other related objects in view, the invention consists in the details of construction and combination of parts as will be more fully understood from the following description, when read in conjunction with the accompanying drawing in which:

The drawing shows a front elevational view of the preferred embodiment for the present invention connected to an air conditioner drain line (represented in phantom).

DETAILED DESCRIPTION OF THE PREFERRED EMBODIMENT

Referring now to the drawing where the present invention is generally referred to with numeral 10, it can be observed that it basically includes pipe assembly 20, inlet female coupler assembly 40, outlet female coupler assembly 50, cap assembly 60 and telescopic cap assembly 80.

As shown in FIG. 1, pipe assembly 20 includes central pipe 21 with inlet pipe 22 and outlet pipe 24 perpendicularly mounted thereon. Pipe 22 is connected to central pipe 21 at one end. Pipe 22 has peripheral flange 23 at its distal end. Flange 23 prevents female connector or coupler member 40 from slipping out since the latter includes inwardly extending flange 44 at the end of cylindrical coupler housing 42. Male connector assembly 46 includes external thread 47 that cooperatively engages with internal thread 43. In the same manner, pipe 24 is connected to central pipe 21. Pipe 24 has peripheral flange 25 at its distal end. Flange 25 prevents female connector or coupler 50 from slipping out since the latter includes inwardly extending flange 54. Male connector 56 includes external thread 57 that cooperatively engages with internal thread 53.

Upper pipe end 26 is connected to cap assembly 60. Lower pipe end 28 is connected to telescopic cap assembly 80. In the preferred embodiment, cap assembly 80 includes internal thread 82 that cooperates with external thread 84.

Inlet female coupler assembly 40 and outlet female coupler assembly 50 have substantially the same function. Inlet female coupler assembly 40 includes ends 41 and 41' (51 and 51' for outlet female coupler assembly 50). Inlet female coupler assembly 40 (and outlet 50) has cylindrical coupler housing 42 (and 52) with internal threads 43 (and 53) adjacent to end 41 (and 51). Inlet female coupler assembly 40 (and outlet female coupler assembly 50) also includes inwardly extending flange 44 (and 54) adjacent to end 41' (and 51').

The ends of drain lines L (upstream) and L' (downstream) have cooperative external threads to provide a substantially watertight engagement with male connector assemblies 46 and 56, at ends 48 and 58, respectively. Male connector assembly 46 (and 56) receives drain line L (and L') and are preferably glued together. The other end of connector assembly 46 (and 56) includes external thread 47 (and 57) that mates with internal thread 43 (and 53) of female connector or coupler assembly 40 (and 50).

Cap assembly 60 is removably mounted to upper pipe end 26. Cap assembly 60 is removed to deposit growth inhibiting chemicals and also for cleaning purposes.

Telescopic cap assembly 80 is removably mounted to lower pipe end 28. Telescopic cap assembly 80 includes internally threaded cap member 86. By turning cap member 86, the effective internal cavity inside cap member 86 and lower end 28 is varied. A user can vary this internal cavity where the growth inhibitor is placed thereby varying its concentration and release time. Other equivalent mechanisms can be used to telescopically move cap member 86.

The foregoing description conveys the best understanding of the objectives and advantages of the present invention.

Different embodiments may be made of the inventive concept of this invention. It is to be understood that all matter disclosed herein is to be interpreted merely as illustrative, and not in a limiting sense.

What is claimed is:

1. A delivery system for air conditioner's drain lines, comprising:

A) an elongated tubular member having first and second ends including first and second openings, respectively, and further including an inlet tubular member perpendicularly mounted to said elongated tubular member adjacent to said first opening, and having a distal end defining an inlet opening and an outlet tubular member perpendicularly mounted to said elongated tubular member between said inlet tubular member and said second opening and having a distal end defining an outlet opening;

B) first and second female connector members rotatably mounted to said distal ends of said inlet and outlet tubular members, said female connectors including an internal thread;

C) a first and second male connectors members each having third and fourth ends, said third ends including a cooperative external thread for mating engagement with said internal thread of said first and second female connector members, and said fourth ends of said first and second male connector members being connected to the upstream and downstream ends of a drain pipe;

D) a first removable cap for selectively closing said first opening; and

E) a second removable cap for selectively closing said second opening thereby defining an internal cavity for receiving growth inhibiting chemicals deposited therein through said opening when said elongated tubular member is in the upright position so that when sufficient condensed water is collected in said internal cavity said inhibiting chemicals dissolve being released over time to said downstream ends.

2. The system set forth in claim 1 wherein said second removable cap includes means for telescopically adjusting the size of said internal cavity thereby varying the strength of the chemical released.

3. The system set forth in claim 2 wherein said means for telescopically adjusting the size of said internal cavity includes mating threads adjacent to said second end and in said second removable cap.

* * * * *